(12) United States Patent
Raspl et al.

(10) Patent No.: US 8,269,789 B2
(45) Date of Patent: Sep. 18, 2012

(54) METHOD AND SYSTEM FOR DISPLAYING PERFORMANCE CONSTRAINTS IN A FLOW DESIGN TOOL

(75) Inventors: Stefan Raspl, Tamm (DE); Yannick Saillet, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 676 days.

(21) Appl. No.: 11/475,929

(22) Filed: Jun. 28, 2006

(65) Prior Publication Data

US 2007/0046664 A1    Mar. 1, 2007

(30) Foreign Application Priority Data

Aug. 25, 2005  (EP) ..................... 05107808

(51) Int. Cl.
*G09G 5/00* (2006.01)
(52) U.S. Cl. ........ 345/619; 709/223; 709/224; 709/225; 709/226; 370/229; 370/231; 370/235; 715/733
(58) Field of Classification Search .................. 715/735; 709/223, 235; 703/21
See application file for complete search history.

(56) References Cited

U.S. PATENT DOCUMENTS

| | | | |
|---|---|---|---|
| 5,649,222 A | 7/1997 | Mogilevsky | |
| 5,706,453 A | 1/1998 | Cheng et al. | |
| 6,012,075 A | 1/2000 | Fein et al. | |
| 6,546,424 B1* | 4/2003 | Cucchiara | 709/226 |
| 6,697,087 B1* | 2/2004 | Kelly | 715/735 |
| 2002/0176367 A1* | 11/2002 | Gross | 370/252 |
| 2003/0229695 A1* | 12/2003 | Mc Bride | 709/224 |
| 2004/0122645 A1* | 6/2004 | Shevenell et al. | 703/21 |
| 2005/0165948 A1* | 7/2005 | Hatime | 709/235 |
| 2006/0050634 A1* | 3/2006 | Gous | 370/229 |
| 2006/0277285 A1* | 12/2006 | Boyd | 709/223 |

OTHER PUBLICATIONS

Wil Van Der Aalst, Kees Van Hee, "Workflow Management: Models, Methods and Systems," pp. 1-359, 2000.
Office Action for European Application 06 763 837.9 date Sep. 21, 2010.

* cited by examiner

*Primary Examiner* — Xiao M. Wu
*Assistant Examiner* — Phi Hoang
(74) *Attorney, Agent, or Firm* — Ingrid M. Foerster; Edell, Shapiro & Finnan, LLC (57) ABSTRACT

A method and system of the present invention determines the performance values of components of a flow by taking the interactions between the components into account, and visualizes the performance values on a graphical user interface during a flow design phase. Thus, interactions between the components of the flow become transparent to the user and bottlenecks can be identified immediately.

30 Claims, 5 Drawing Sheets

METHOD AND SYSTEM FOR DISPLAYING PERFORMANCE CONSTRAINTS IN A FLOW DESIGN TOOL

BACKGROUND OF THE INVENTION

1. Field of the Invention

The present invention relates to flow modeling tools in general and to the visualization of flows in particular.

2. Discussion of Related Art

Flow modeling tools are frequently employed during the design phase of a flow process, such as a workflow process or a dataflow process. All flow modeling tools comprise a graphical user interface on which the flow to be designed can be, drawn. This is done in most flow modeling tools by selecting operators from a palette and placing them on the graphical user interface. Operators are steps composing the flow.

In the case of a dataflow, an operator can be any kind of data source (e.g., database, flat file, etc.) providing some data, any kind of transformer applying a transformation on the data, or any kind of target in which the data can be loaded.

In the case of a workflow, an operator can be any kind of activity playing a role in the flow (e.g., invocation of a service, notification to the user, etc.).

In the case of the design of a computer network, an operator can be any kind of hardware (e.g., computer, router, etc.) providing or consuming some data.

In many cases, each operator can have a list of possible input and output channels. The input channels can accept incoming data to be processed by the operator, while output channels produce transformed data that can be used as an input by another operator.

The flow itself is defined by drawing some links between the operators composing the flow. Each link connects an output channel of one operator with an input channel of another operator. A link thereby represents a data transfer or a logical transition between two operators. A link between two operators can also represent a physical apparatus, such as a network connection when a dataflow or a computer network is modeled.

Modeling flows is however becoming more and more complex due to the many components involved as well as heterogeneous environments becoming more popular. For example, when modeling data flows in an ETL (extract, transform, load; meaning processes to extract data from heterogeneous sources, transform them and finally load them in a data warehouse) scenario between databases, this usually involves a varying range of databases located on different servers, connected through arbitrary network connections. Data is thereby passed from one server to another over a network connection. Bottlenecks can stem from network connections being too slow for a required data throughput. Servers incapable of delivering data at a required speed will limit the utilization of successive servers. Moreover, peak loads on an individual server can cause it to have too high a load, thus preventing it from handling other tasks scheduled for that server.

Designing a flow process is typically twofold. In the first phase, the flow is designed by use of a respective device. In the second phase, the design is deployed in the target environment. Keeping a good overview of the environment is essential, but does not guarantee for optimum results.

Furthermore, problematic areas are most often only identified when the design is finally implemented. Resolving issues at that point is more costly than during design time and additionally can produce unrecoverable losses.

Up to now, flow design tools only display what the user designs, but do not take any performance values of the operators or the links into account. An exemplary performance value of an operator which represents, for example, the JOIN operation is the maximum speed at which data is processed. An exemplary performance value of a link which represents, for example, a network cable is the maximum bandwidth the cable supports. Annotations are possible but limited to an individual object only. An impact on related objects is not taken into account nor visualized accordingly. Users can design anything that the respective device allows, but unreasonable or impossible designs are not prevented or at least indicated.

Also, interactions among the individual components, the operators, input/output channels and links that make up the dataflow, are not taken into account.

Another class of existing tools are simulation tools. Flow design tools and simulation tools are frequently comprised in one product. The simulation tools do a precise simulation of how a finished design will behave in a real environment. With the currently available tools, designing a flow and considering the performance of the flow is therefore carried out in two phases. The design phase enables the operators and the links to be arranged on the graphical user interface by the user so that the resulting flow fulfills user requirements. In the simulation or measurement phase, the performance of the flow is simulated. According to the result of the simulation, the user changes the design of the flow so that the performance of the flow simulated in a subsequent simulation increases.

Going back and forth between these two phases can however become tedious and small changes that cause large effects are likely to be overseen or hard to locate if one does multiple changes in between each simulation phase.

There is therefore a need for an improved flow design tool.

SUMMARY OF THE INVENTION

In accordance with the present invention, there is provided a flow design tool that comprises a graphical user interface for visual representation of a flow, whereby the flow comprises at least two operators and at least one link, whereby one operator of the at least two operators comprises at least one input channel and whereby another operator of the at least two operators comprises at least one output channel and whereby the link connects the output channel of the one operator with the input channel of the other operator. At least one performance value for each of the at least two operators is determined. In addition, at least one performance value for the at least one input channel of the operator, at least one performance value for the at least one output channel of the operator, and at least one performance value for the link are determined. The at least one performance value of each of the at least two operators, the at least one performance value of the at least one input channel of the operator, the at least one performance value of the at least one output channel of the operator, and the at least one performance value of the link are displayed on the graphical user interface for visual representation of the flow.

The present invention is particularly advantageous as the performance values, which can, for example, be limiting factors of the components, are displayed on the graphical user interface. The user receives this feedback on the impact as well as on side effects of the design actions. In this way, interactions between components become transparent to the user and bottlenecks can be identified during the design of the flow.

In accordance with an embodiment of the present invention, there is provided a method wherein two performance values, the actual throughput and the maximum throughput, are determined for each of the at least two operators and wherein two performance values, the actual throughput and the maximum throughput, are determined for the at least one input channel of the operator, and wherein two performance values, the actual throughput and the maximum throughput, are determined for the at least one output channel of the other operator, and wherein two performance values, the actual throughput and the maximum throughput, are determined for the link.

In accordance with an embodiment of the present invention, there is provided a method wherein the at least one performance value of each of the at least two operators, the at least one performance value for the at least one input channel, the at least one performance value of the at least one output channel, and the at least one performance value of the link are displayed during the design time of the flow. This has the advantage that the user can immediately identify any bottlenecks and rearrange the design so that the bottlenecks disappear. This diminishes the overall time for the design of a flow and thus the present invention provides a method by which flows can be designed more cost efficiently.

In accordance with an embodiment of the present invention, there is provided a method where the at least one performance value of each of the at least two operators, the at least one performance value of the input channel, the at least one performance value of the output channel, and the performance value of the link are displayed on the graphical user interface for visual representation of the flow by use of text, color coding, symbol, size, or line width convention.

In accordance with an embodiment of the present invention, the at least one performance value of each of the at least two operators is determined by use of a mathematical function.

In accordance with an embodiment of the present invention, the at least one performance value of the at least one link is determined by use of a mathematical function.

In accordance with an embodiment of the present invention, the at least one performance value of each of the at least two operators, the at least one performance value of the input channel, the at least one performance value of the output channel, and the performance value of the link are determined by a simulation tool employed for the simulation of the flow.

In accordance with an embodiment of the present invention, the flow design tool comprises a simulation tool employed for the simulation of the flow, and the at least one performance value of each of the at least two operators, the at least one performance value of the input channel, the at least one performance value of the output channel, and the at least one performance value of the link are determined in a first step by use of a mathematical function or by user input and in a second step by the simulation tool.

The method in accordance with the present invention is particularly advantageous as it enables the user to identify any severe problems, such as bottlenecks, during the design phase of the flow. The user can rearrange the flow and eliminate any bottlenecks. More precise performance values are determined by use of the simulation tool. This enables the user to eliminate any subtle problems of the flow.

In accordance with an embodiment of the present invention, the at least one performance value of each of the at least two operators, the at least one performance value of the input channel, the at least one performance value of the output channel, and the performance value of the link are determined by specifications provided by the flow design tool.

In another aspect, the present invention relates to a computer program product which comprises computer executable instructions in order to perform the method.

In another aspect, the present invention relates to a data processing system comprising a flow design tool which comprises a graphical user interface for visual representation of a flow. The flow comprises at least two operators and at least one link. One operator of the at least two operators comprises at least one input channel and another operator of the at least two operators comprises at least one output channel, whereby the link connects the output channel of the one operator with the input channel of the other operator.

BRIEF DESCRIPTION OF THE DRAWINGS

In the following, preferred embodiments of the invention will be described in greater detail by way of example only making reference to the drawings in which.

DETAILED DESCRIPTION

Figure 1:
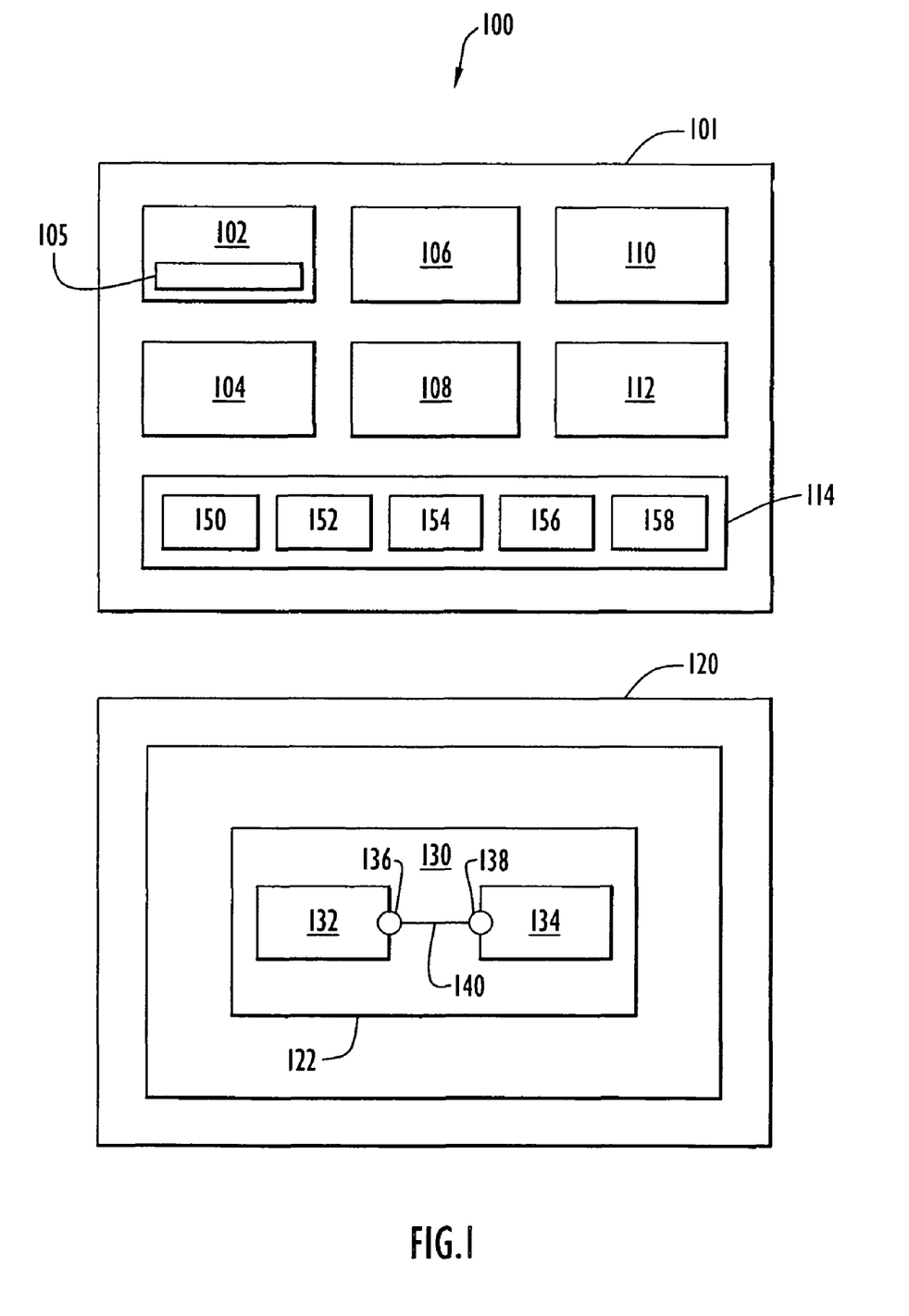
FIG. 1 is a block diagram of a system that implements an embodiment of the present invention.

FIG. 1 is a block diagram of a system 100 that implements an embodiment of the present invention. The system comprises a computer system 101 and a screen 120. The flow design tool 102 and the data processing system 104 in accordance with the present invention are executed by the microprocessor 106. The flow design tool 102 and the data processing system 104 use a graphics card 110 to generate a graphical user interface 122 on the screen 120. The flow design tool 102 can comprise a flow simulation tool 105.

The flow design tool 102 enables the user to create a flow 130 on the graphical user interface 122 by use of an input device 108 (e.g., a keyboard, a mouse, etc.). The flow comprises operators 132 and 134 with an input channel 138 and an output channel 136. A link 140 connects the output channel 136 with the input channel 138.

An operator can represent, for example, a hardware device on which a database is stored, a data processing system, a computer, a router etc. A link can represent, for example, a physical apparatus such as a network connection or a network cable. An input or output channel can represent, for example, any physical I/O port such as an Ethernet card through which data is processed from a computer to a network.

The data processing system 104 determines by use of the microprocessor 106 a performance value 150, 152 for each of the two operators 132 and 134, a performance value 154 for the input channel 138, a performance value 156 for the output channel 136, and a performance value 158 for the link 140. In a preferred embodiment of the present invention, these performance values are determined instantly when the user places or creates the corresponding operators, channels or links on the graphical user interface. The performance values 150, 152, 154, 156, 158 are stored on the volatile memory device 114 and depicted graphically on the graphical user interface. In another embodiment of the present invention, the performance values 150, 152, 154, 156, 158 are stored on the non-volatile memory device 112.

The performance values 150, 152, 154, 156, and 158 of the various components of the flow determined by the data processing system 104 might not be very precise. This is however not a disadvantage since the data processing method aims to identify larger differences in the performance values of the various components of the flow. The flow simulation tool 105 can be employed to obtain precise values of the performance values 150, 152, 154, 156, and 158.

Figure 2:
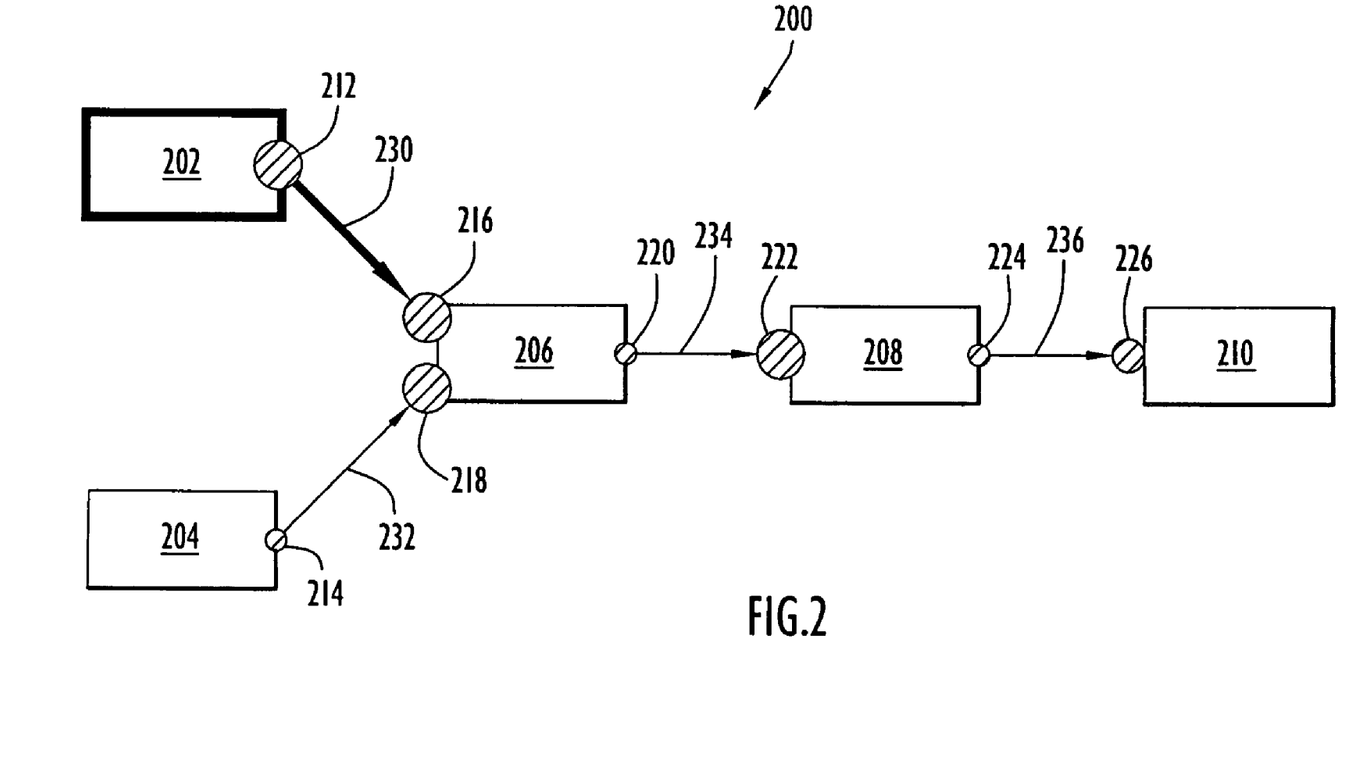
FIG. 2 is an illustration showing how a dataflow is represented in accordance with an embodiment of the present invention.

FIG. 2 is an illustration showing how a dataflow 200 is displayed. The operators are represented by boxes, output channels are represented by bullets on the right side of the operators, input channels are represented by circles on the left side of the operators, and links are represented by arrows between the operators. In this example, the user has designed the following.

Data is extracted from a first data source 202 and a second data source 204. Sources have one output channel and no input channel. Here, first data source 202 is assumed to be a table stored on a local database and second data source 204 is assumed to be another table stored on a remote database. Data from first data source 202 is transferred through output channel 212 and the link 230 via the input channel 216 to operator JOIN 206. Data from data source 204 is transferred through output channel 214 and the link 232 via the input channel 218 to the operator JOIN 206. The operator JOIN 206 represents an operation that brings together data from first data source 202 and data from second data source 204. Data coming from the two sources are read by the operator JOIN 206 and brought together in a single table.

The joined data is transferred through the output channel 220, the link 234, and the input channel 222 to the SORT operator 208. The joined data provided by the operator JOIN 206 is sorted by the operator SORT 208.

The data is transferred from the operator SORT 208 through output channel 224, link 236, and input channel 226 to the operator DATA TARGET 210 which could represent any table in a data warehouse.

In a preferred embodiment of the present invention, two performance values, the maximum and actual throughput, are determined for each of the operators 202, 204, 206, 208, 210 when the operators are selected and displayed on the graphical user interface. Moreover, two performance values, the actual and the maximal throughput, are determined for each of the input channels 216, 218, 222, and 226, two performance values, the actual and maximal throughput, are determined for each of the output channels 212, 214, 220, and 224, and two performance values, the actual and maximal throughput, are determined for each of the links 230, 232, 234, and 236.

The maximum throughput of an operator, channel or link is the theoretical maximum amount of data per time unit that can be processed by this element when no other elements limit the process. The actual throughput is dependent on the maximum throughput of the element but also on the throughput of the other elements composing the flow.

In the example described above for dataflow 200, the maximum throughput of the input channels 216, 218, 222, and 226 is displayed, whereas the actual throughputs of the operators 202, 204, 206, 208, and 210, of the output channels 212, 214, 220, and 224, and of the links 230, 232, 234, and 236 are visualized.

The method and system in accordance with the present invention is however not restricted to this way of displaying the determined performance values. Other ways, for example, displaying actual performance values for operators, channels, and links, might also be possible.

In the example described above for dataflow 200, the first data source 202 is a local database with a high throughput since no network connection limits the throughput. Thus, the data source is symbolized by a box with thick lines, and its output channel 212 is visualized by a large circle, indicating that the actual throughput of this element is high.

Second data source 204 is a remote database from which data can only be retrieved at a low speed. For example, second data source 204 can be a tape drive. It is thus represented by a box with thin lines and its output channel is depicted as a small circle symbolizing the low throughput.

The link 230 is a fast link, since first database 202 is a local database. Thus, the maximum throughput of link 230 is high. Since data source 202 and output channel 212 deliver the data at a high rate, the actual throughput of link 230 is also high and thus link 230 is depicted graphically by a thick arrow.

The link 232 can be a fast network connection with a high maximum throughput. However, since data source 204 and output channel 214 deliver data at a low rate, the actual throughput of link 232 is low. The link is therefore depicted by a thin arrow.

The operator JOIN 206 represents an operation which theoretically processes data with a high maximum throughput. This is symbolized by the two large circles of the input channel 216 and 218 on its left side.

The operator JOIN 206 is consuming data coming from both the first data source (high throughput) and the second data source (low throughput). The throughput of operator JOIN 206 is therefore limited by the throughput of the second data source 204. Thus, the operator JOIN 206 is displayed by a box with thin lines and its output channel 220 by a small circle.

The link 234 can be a fast link with a high maximum throughput. However, since data is delivered by the output channel 220 at a low rate, the link 234 is displayed as a thin arrow.

Similar to the operator JOIN 206, the operator SORT 208 has a high maximum throughput, but its actual throughput is limited by the rate at which data is coming to the operator. Its actual throughput is therefore low and thus the operator is represented by a box with thin lines and the output channel 224 by a small output circle.

The link 236 can be a fast link with a high maximum throughput. However, since data is delivered by the output channel 224 at a low rate, the link 236 is shown as a thin arrow.

The operator DATA TARGET 210 has a maximum throughput which is lower than the maximum throughput of the operator JOIN 206 and the operator SORT 208. The circle representing the input channel 226 is therefore smaller in size as the size of the circle representing the input channels 216, 218, 222 of the operators 206 and 208, respectively.

The actual throughput of the operator DATA TARGET 210 is determined by the rate at which data is delivered by link 236. Thus, the operator DATA TARGET 210 is represented by a box with thin lines.

The visualization of performance values is not limited to boxes and arrows with changing thickness or to different sized circles. Another way of visualization could be the use of text showing explicitly the maximum and actual throughputs. Yet another way could be the use of color coding.

Figure 3:
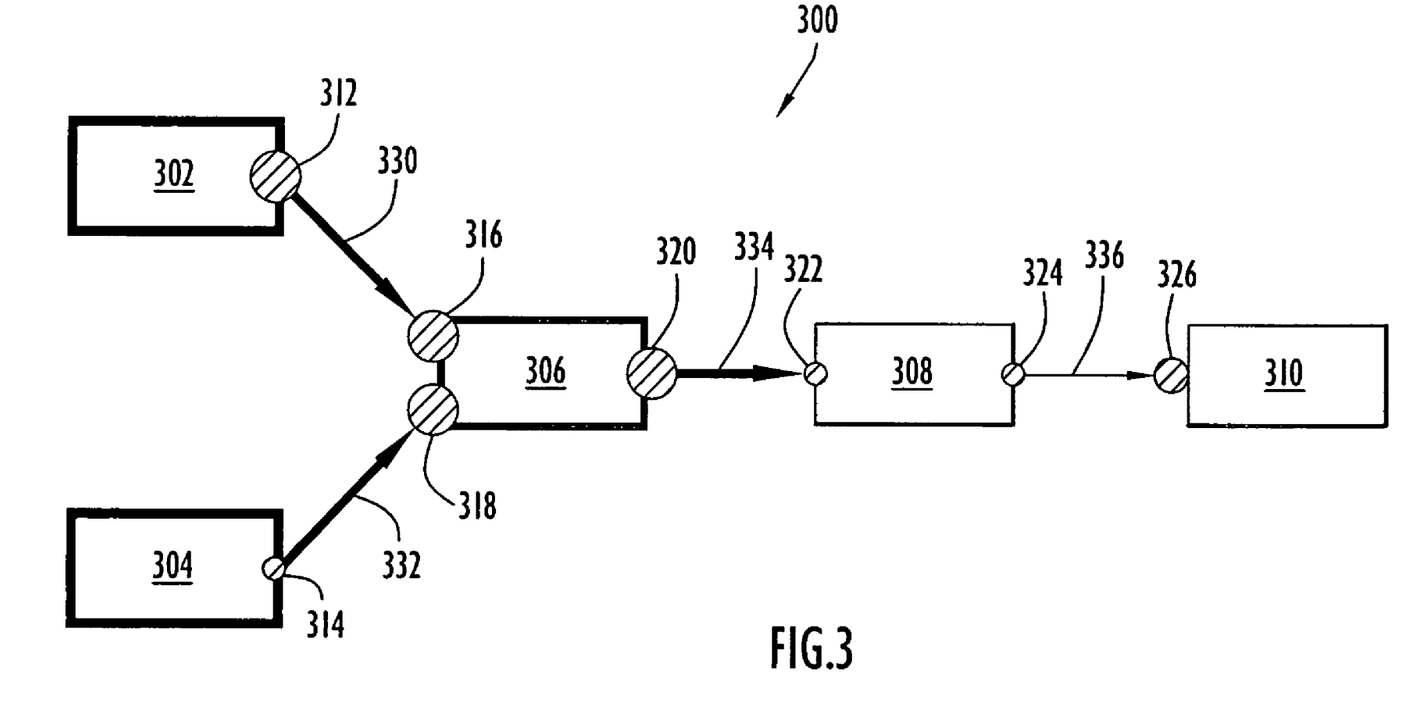
FIG. 3 is an illustration depicting how a dataflow is represented in accordance with another embodiment of the present invention.

FIG. 3 is an illustration showing how another dataflow 300 is displayed. The illustration comprises first data source 302 and second data source 304, the operator JOIN 306, the operator ROTATE 308, the operator DATA TARGET 310, input channels 316, 318, 322, and 326, output channels 312, 314, 320, and 324, and links 330, 332, 334, and 336.

First data source 302, the operator JOIN 306 and the operator TARGET 310 are intended to have the same properties as the operators 202, 206, and 210.

Second data source 304 represents however a faster data source than second data source 204. The link 332 is also a fast link. Data source 304 is therefore depicted by a box with thick lines, the output channel 314 by a large circle and the link 332 is therefore visualized by a thick arrow. Moreover, the operator JOIN 306 is displayed by a box with thick lines and the output channel 320 by a circle with a large radius.

The link 334 has a high maximum throughput. Since the actual throughputs of operator JOIN 306 and output channel 320 are also high, the actual throughput of link 334 is high. Consequently, the link 334 is displayed by a thick arrow.

The operator ROTATE 308 requires a lot of CPU resources and thus has a small maximum throughput. Thus, the system in accordance with the present invention depicts the input channel 322 by a small circle and the operator ROTATE 308 by a box with thin lines.

Data delivered by link 334 at a high speed is now further processed by the low speed input channel 322 and the low speed operator ROTATE 308. The ROTATE operator is therefore identified as a bottleneck of the flow which is represented by the thick arrow of link 334 pointing at the small circle of input channel 322.

The present invention is particularly advantageous as it enables the user to recognize immediately which impact a design decision has on the whole flow. A bottleneck is visualized and can be removed immediately by a redesign of the flow. In another embodiment of the present invention, a bottleneck might also made apparent in addition to the visualization by use of a sound.

The maximum and actual throughput of the output channel 324 is low so that it is depicted by a small circle. The maximum throughput of link 336 is high, but its actual throughput is limited by the actual throughput of output channel 324, so that link 336 is represented by a thin arrow.

The operator DATA TARGET 310 has a maximum throughput which is lower than the maximum throughput of the operator JOIN 306 but higher than the operator ROTATE 308. The circle representing the input channel 326 is therefore smaller in size as the size of the circle representing the input channels 316, 318, but larger than the circle representing the input channel 322.

The actual throughput is however determined by the rate at which data is delivered by link 336. Thus, the operator DATA TARGET 310 is represented by a box with thin lines.

The following paragraphs disclose various embodiments employed for the determination of the performance values such as the maximum and actual throughput. In an embodiment of the present invention, the user defines the maximum throughput of an operator, channel or link by editing their properties.

For example, if a link represents a 100 Mbit Ethernet connection, its maximum throughput is specified to be 100 Mbit. The actual throughput is then determined by taking into account the throughput of the preceding output channel. If the actual throughput of the output channel is lower than the maximum throughput of the link, then the actual throughput of the link is given by the actual throughput of the output channel.

In a workflow, however, a link represents a logical transition and is not bound to any physical constraint. Thus, the user does not specify any performance values. In an embodiment of the present invention, the actual throughput of the link is then assumed to be equal to the actual throughput of the preceding output channel.

In an embodiment of the present invention, the user also assigns a maximum throughput to the output channel, to the input channel, and to the operator. The actual throughput of the output channel is either equal to the maximum throughput of the output channel or equal to the actual throughput of the operator, depending on which value is the smaller one. The actual throughput of the operator is either the maximum throughput of the operator or the actual throughput of the input channel, depending on which value is the smaller one. The actual throughput of the input channel is then either its maximum throughput or the actual throughput of the preceding link, depending on which of the two values is the smaller one.

In an embodiment of the present invention, the actual throughputs of the input and output channels are displayed by circles with various sizes. Additionally, the maximum throughput of the operator is displayed by adapting the thickness of the frame of the box which represents the operator. In this way, a bottleneck between the input channel and the operator can be revealed during the design phase. The user can rearrange the flow and make the bottleneck disappear. This facilitates the flow design process since bottlenecks can be eliminated immediately.

The method in accordance with the present invention is not limited to the way of displaying throughputs as described in the preceding paragraph. For example, in another embodiment, the maximum throughputs and the actual throughputs of all elements in the flow might be displayed in various manners (e.g., by text, color coding, different sized circles and rectangles, etc.). A bottleneck might also be identified by a sound or a blinking operator.

If an operator has more than one input channel and more than one output channel, the user assigns maximum throughputs to each input and to each output channel and to the operator. The actual throughput of all input channels is, for example, either given by the smallest maximum throughput of all input channels or by the actual throughput of the preceding link, depending on which value is the smaller one.

If the maximum throughput of the operator is larger than the actual throughput of the input channels, then the actual throughput of the operator is taken to be the actual throughput of the input channels. Otherwise, it is taken to be the maximum throughput of the operator and a bottleneck is identified. The actual throughputs of all output channels can then, for example, be given by either the actual throughput of the operator or by the minimum maximal throughput of the operators, depending on which value is the smaller one.

As mentioned above, other possibilities of determining an actual throughput from specified maximum throughputs are within the scope of the present invention. The examples given above are only presented to demonstrate a few possible embodiments.

The performance values of the operators, channels, and links can also be determined in other ways. For example, in an ETL scenario, the throughput of a data source (e.g., JDBC Extract from DB2 from IBM Corporation) can be determined from a measurement of the actual throughput or from specifications delivered by the database manufacturer. In the following, examples are given where results of measurements or specifications of databases, data mining engines or ETL components can be found on the world wide web:

http://www.sysbase.com/detail?id=1009664
http://www-128.ibm.com/developerworks/db2/library/techarticle/dm-0503aschoff/ http://support.sas.com/rnd/scalability/papers/41265489-100.pdf http://developer.mimer.com/features/feature_16.htm http://www.nyoug.org/highspeedetl.pdf The performance values of operators, links, and channels can also be determined by use of the commercially available tool "Visual Explain" which is comprised in DB2 from IBM Corporation. "Visual Explain" comprises an application program interface (API). The data processing system in accordance with the present invention can request, for example, the following parameters of a database via the API from "Visual Explain":

The number of database rows which can be processed in one step,

The processing power required to increase or decrease a data volume,

The processing speed for data filtration. In this case, "Visual Explain" can request, however, additional information which must be provided by the user, The data transfer rate from a data source to a data target, whereby "Visual Explain" takes into account the network architecture.

The user therefore only selects operators, channels, and links and arranges them on the graphical user interface. The data processing system in accordance with the present invention determines by use of the specifications found on the world wide web as cited above or by use of "Visual Explain" performance values for the operators, channels and links.

However, in contrast to the simulation tools, the system in accordance with the present invention only aims to determine an approximate performance value and not precise performance values.

Figure 4:
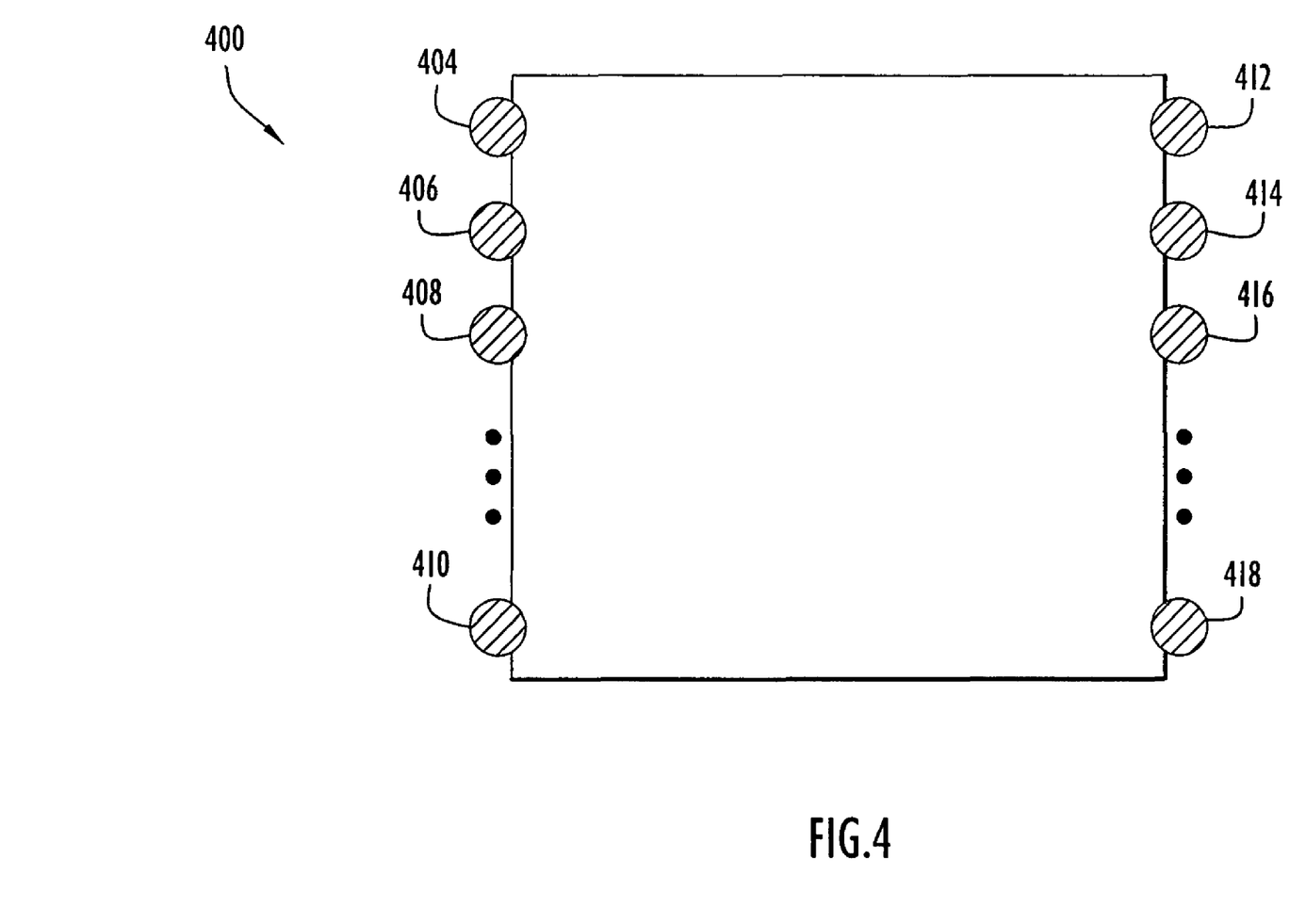
FIG. 4 is a block diagram depicting an operator and various input/output channels.

FIG. 4 is a block diagram depicting an operator 402 that comprises n input channels such as 404, 406, 408, and 410 and m output channels such as 412, 414, 416, and 418. Another way of determining a performance value for the operator is to assign a mathematical function to the operator which relates the n input channels to the m output channels.

In block diagram 400, $in_1$ is the maximal throughput at which data is processed through input channel 404, $in_2$ is the maximal throughput at which data is processed through input channel 406, $in_3$ is the maximal throughput at which data is processed through input channel 408, and $in_n$ is the maximal throughput at which data is processed through input channel 410. Accordingly, $out_1$ is the throughput through output channel 412, $out_2$ is the throughput through output channel 414, $out_3$ is the throughput through output channel 416, and $out_m$ is the throughput processed through output channel 418.

For each output channel i, a function $f_i$ can be specified which takes the throughputs of all input channels into account for a determination of the throughput of output channel i:

$out_i = f_i(in_1, in_2, in_3, \ldots, in_n)$.

The function f can, for example, be a constant value in the case where the operator represents a local data source (e.g., this is a special case because sources have no inputs: $out_i = f_i(\ )$).

In the case of the operator JOIN with two input channels and one output channel, the function f can be defined by $out = min(in_1, in_2, speed)$. Here speed is the throughput of the operator JOIN and min is the operation which selects the minimum value of $in_1$, $in_2$, and speed.

The data processing system can, for example, comprise a database in which such a function is stored for each operator comprised in the flow design tool.

In the same way, a mathematical function can be defined for a link. For example, for a link symbolizing a network cable, the throughput (out) can be determined by selecting the minimum value between the throughput of the preceding output channel (in) and the maximum bandwidth (bandwidth) supported by the cable:

$out = min(in, bandwidth)$.

Figure 5:
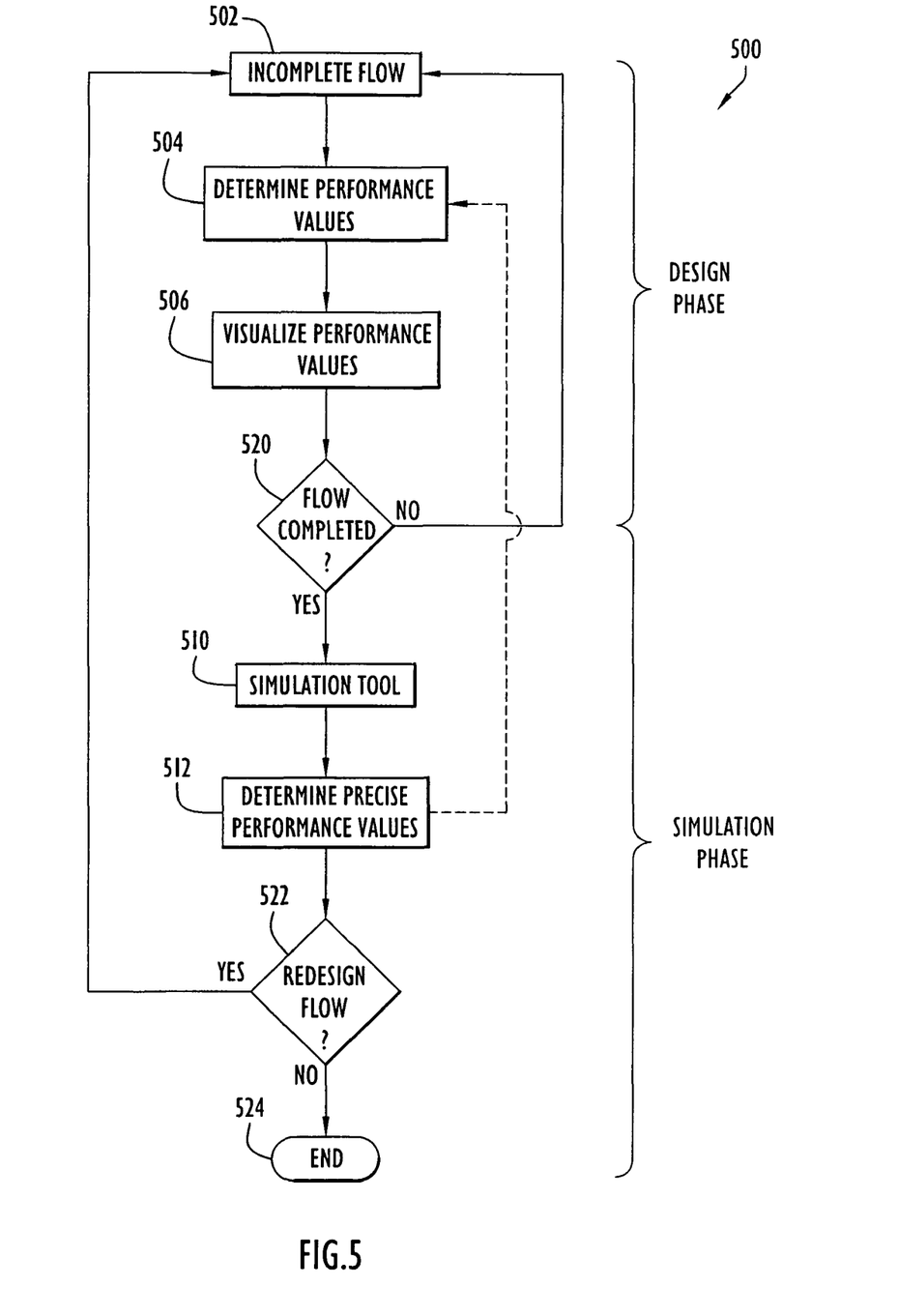
FIG. 5 is a flow diagram depicting a flow design process.

FIG. 5 is a flow diagram depicting a flow design process that is typically carried out when the flow design tool comprises a simulation tool. As mentioned above, the design process is then carried out in two phases. The first phase is referred to as the design phase and the second phase is referred to as the simulation phase. In flow diagram 500, the design phase comprises steps 502, 504, 506, and 520. The simulation phase comprises steps 510, 512, 522, and 524. If the flow design tool does not comprise a simulation tool, the flow design process comprises only the design phase.

The flow design process starts with step 502 in which the user designs an incomplete flow on the graphical user interface. In step 504, the data processing system 104 in accordance with the present invention determines performance values of the operators, channels and links of the incomplete flow, whereby the interactions of the various components of the flow are taken into account as described previously.

The expression incomplete flow refers to a flow which is still in the design phase. Not all components required to fulfill the objectives of the flow have yet been placed on the graphical user interface or all components have been placed but they are considered to be arranged in a way which is not optimal with respect to the performance of the flow.

In step 506, the performance values of the flow are visualized on the graphical user interface. In step 520, the user decides if the flow is complete or not.

If the user considers the flow to be incomplete, the flow diagram steps back to step 502. The user will change or rearrange the components of the flow. The visualization of the performance values which reveals, for example, any bottlenecks helps the user to rearrange the incomplete flow. This is advantageous as it enables the user to redesign the flow during the design phase and to aim for an optimal design with respect to the performance of the flow. Steps 504, 506, and 520 are repeated until the user decides that the flow is complete.

If the user decides in step 520 that the flow is complete, the flow diagram proceeds with step 510, where the flow design enters the simulation phase. In step 510, the user employs a simulation tool for simulating the performance of the flow diagram. In step 512, the simulation tools determines precise performance values of the various components of the flow.

The data processing system 104 in accordance with the present invention determines the performance values in step 504. For example, in an embodiment of the present invention, the maximum throughput of an operator, a channel, or a link is determined by requesting the maximum throughput from the user or from a database as described above. The actual throughput of an operator, channel, or link is then obtained by comparing its maximum throughput with the actual throughput of the previous element in the flow and taking the smallest value as actual throughput of the operator, channel, or link. Thus, only an estimate for the actual throughput of each flow element is determined which is sufficient to reveal, for example, any bottlenecks occurring in the flow. The simulation tool, however, determines precise performance values in the sense that the actual throughput of an element of the flow is determined by a simulation of the flow and not by a comparison with the throughput of the preceding flow element.

In step 522, the user decides whether to redesign the flow or be satisfied with the performance of the flow. If the user does not want to redesign, the flow diagram ends in step 524 with the finished flow design.

If the user decides to redesign the flow, the design process starts again at step 502. However, the performance values of the various components of the flow which have been determined by the simulation tool in step 512 are now used during the design phase by the data processing system in step 504. For example, in an embodiment of the present invention in which the actual and maximum throughput of each element of the flow are determined, the actual throughputs of the elements are taken to be the throughput determined for each element of the flow by the simulation.

These values obtained from the simulation can only be used in the modelling phase until one element preceding the "simulated" elements invalidates the simulated values. In this case, the modelling tool will again use the theoretical values for the invalidated elements, until the simulation is run again.

LIST OF REFERENCE NUMERALS 100 block diagram
101 computer system
102 flow design tool
104 data processing system
105 flow simulation tool
106 microprocessor
108 input device (keyboard, mouse)
110 graphics card
112 non-volatile memory device
114 volatile memory device
120 screen
122 graphical user interface
130 flow
132 operator
134 operator
136 output channel
138 input channel
140 link
150 performance value of operator
152 performance value of operator
154 performance value of input channel
156 performance value of output channel
158 performance value of link
200 flow diagram
202 first data source
204 second data source
206 join operation
208 sort operation
210 data target operator
212 output channel
214 output channel
216 input channel
218 input channel
220 output channel
222 input channel
224 output channel
226 input channel
230 link
232 link
234 link
236 link
300 flow diagram
302 first data source
304 second data source
306 join operator
308 rotate operator
310 data target operator
312 output channel
314 output channel
316 input channel
318 input channel
320 output channel
322 input channel
324 output channel
326 input channel
330 link
332 link
334 link
336 link
400 block diagram of an operator
402 operator
404 input channel
406 input channel
408 input channel
410 input channel
412 output channel
414 output channel
416 output channel
418 output channel
500 flow diagram
502 incomplete flow
504 determine performance value
506 visualize performance values
510 simulation tool
512 determine precise performance values
520 decision
522 decision
524 END

What is claimed is:

1. A computer-implemented method for designing a flow comprising:
   receiving a flow entered by a user on a graphical user interface, wherein said flow includes a plurality of interconnected objects each displayed on said graphical user interface and associated with a performance value;
   assigning a predetermined approximation for said associated performance value of each of said interconnected objects;
   determining approximations for said performance values associated with said objects based on comparisons of said predetermined approximations for said objects and prior to a simulation of said entered flow that produces precise performance values for said objects, wherein said performance value of each said interconnected object represents a rate of data provided by that object, and wherein said approximation for said performance value of each of one or more of said objects is determined from a comparison of the predetermined approximation for that performance value and determined approximations for performance values of one or more preceding ones of said interconnected objects within said flow and limited to a lowest approximation for performance values within said comparison;
   providing indications of said approximations for said determined performance values on said graphical user interface to enable verification of said entered flow prior to said simulation by indicating one or more areas within said entered flow with problematic data rate transitions between said interconnected objects; and
   enabling revision of said entered flow on said graphical user interface for said verification prior to said simulation, wherein said revision addresses one or more of said indicated problematic areas within said flow.

2. The method of claim 1, wherein said providing indications of said determined approximations for said performance values on said graphical user interface includes:

altering visual characteristics of a displayed object in accordance with said associated approximation for said performance value to indicate said problematic areas.

3. The method of claim 1, wherein said providing indications of said determined approximations for said performance values on said graphical user interface includes:
  detecting and highlighting a bottleneck in said entered flow on said graphical user interface.

4. The method of claim 1, wherein said predetermined approximations include a maximum throughput and determining approximations for said performance values includes:
  determining approximations for an actual throughput for said associated objects within said entered flow.

5. The method of claim 1, wherein said providing indications of said determined approximations for said performance values on said graphical user interface includes:
  displaying said approximations for said performance values on said graphical user interface via at least one of text, color coding, a symbol, object size, and object line width.

6. The method of claim 1, wherein said determining approximations for said performance values includes:
  determining approximations for said performance values based on one of a mathematical function and specifications provided by a flow design tool including said predetermined approximations.

7. The method of claim 1, further including:
  simulating said entered flow and generating said performance values from said simulation; and
  updating said determined approximations for said performance values with said generated performance values from said simulation.

8. The method of claim 1, wherein said determining approximations for said performance values includes:
  retrieving performance information from one or more external information stores each storing performance information including said predetermined approximations for one or more of said associated objects, and determining approximations for said performance values for said one or more of said associated objects based on said retrieved performance information.

9. The method of claim 1, wherein said objects include an operator, at least one input channel and at least one output channel of an operator for input and output, and a link connecting operators.

10. The method of claim 1, wherein said approximations for said performance values of said objects within said flow are each limited to a lowest rate of data represented by one of the predetermined approximation for that performance value and the approximations for performance values of one or more preceding ones of said interconnected objects within said flow.

11. A computer program product comprising a tangible computer readable medium with computer executable instructions for performing a method for designing a flow, said method comprising:
  receiving a flow entered by a user on a graphical user interface, wherein said flow includes a plurality of interconnected objects each displayed on said graphical user interface and associated with a performance value;
  assigning a predetermined approximation for said associated performance value of each of said interconnected objects;
  determining approximations for said performance values associated with said objects based on comparisons of said predetermined approximations for said objects and prior to a simulation of said entered flow that produces precise performance values for said objects, wherein said performance value of each said interconnected object represents a rate of data provided by that object, and wherein said approximation for said performance value of each of one or more of said objects is determined from a comparison of the predetermined approximation for that performance value and determined approximations for performance values of one or more preceding ones of said interconnected objects within said flow and limited to a lowest approximation for performance values within said comparison;
  providing indications of said approximations for said determined performance values on said graphical user interface to enable verification of said entered flow prior to said simulation by indicating one or more areas within said entered flow with problematic data rate transitions between said interconnected objects; and
  enabling revision of said entered flow on said graphical user interface for said verification prior to said simulation, wherein said revision addresses one or more of said indicated problematic areas within said flow.

12. The computer program product of claim 11, wherein said providing indications of said determined approximations for said performance values on said graphical user interface includes:
  altering visual characteristics of a displayed object in accordance with said associated approximation for said performance value to indicate said problematic areas.

13. The computer program product of claim 11, wherein said providing indications of said determined approximations for said performance values on said graphical user interface includes:
  detecting and highlighting a bottleneck in said entered flow on said graphical user interface.

14. The computer program product of claim 11, wherein said predetermined approximations include a maximum throughput and determining approximations for said performance values includes:
  determining approximations for an actual throughput for said associated objects within said entered flow.

15. The computer program product of claim 11, wherein said providing indications of said determined approximations for said performance values on said graphical user interface includes:
  displaying said approximations for said performance values on said graphical user interface via at least one of text, color coding, a symbol, object size, and object line width.

16. The computer program product of claim 11, wherein said determining approximations for said performance values includes:
  determining approximations for said performance values based on one of a mathematical function and specifications provided by a flow design tool including said predetermined approximation values.

17. The computer program product of claim 11, wherein said method further includes:
  simulating said entered flow and generating said performance values from said simulation; and
  updating said determined approximations for said performance values with said generated performance values from said simulation.

18. The computer program product of claim 11, wherein said determining approximations for said performance values includes:
  retrieving performance information from one or more external information stores each storing performance information including said predetermined approximations for one or more of said associated objects, and determining approximations for said performance values for said one or more of said associated objects based on said retrieved performance information.

19. The computer program product of claim 11, wherein said objects include an operator, at least one input channel and at least one output channel of an operator for input and output, and a link connecting operators.

20. The computer program product of claim 11, wherein said approximations for said performance values of said objects within said flow are each limited to a lowest rate of data represented by one of the predetermined approximation for that performance value and the approximations for performance values of one or more preceding ones of said interconnected objects within said flow.

21. A data processing system comprising:
at least one processor; and
a storage device accessible to the at least one processor, wherein the storage device has stored thereon a computer program for controlling the at least one processor to design a flow, and wherein the at least one processor is operative to execute instructions of the computer program to carry out:
receiving a flow entered by a user on a graphical user interface, wherein said flow includes a plurality of interconnected objects each displayed on said graphical user interface and associated with a performance value;
assigning a predetermined approximation for said associated performance value of each of said interconnected objects;
determining approximations for said performance values associated with said objects based on comparisons of said predetermined approximations for said objects and prior to a simulation of said entered flow that produces precise performance values for said objects, wherein said performance value of each said interconnected object represents a rate of data provided by that object, and wherein said approximation for said performance value of each of one or more of said objects is determined from a comparison of the predetermined approximation for that performance value and determined approximations for performance values of one or more preceding ones of said interconnected objects within said flow and limited to a lowest approximation for performance values within said comparison;
providing indications of said approximations for said determined performance values on said graphical user interface to enable verification of said entered flow prior to said simulation by indicating one or more areas within said entered flow with problematic data rate transitions between said interconnected objects; and
enabling revision of said entered flow on said graphical user interface for said verification prior to said simulation, wherein said revision addresses one or more of said indicated problematic areas within said flow.

22. The data processing system of claim 21, wherein said providing indications of said determined approximations for said performance values on said graphical user interface includes:
altering visual characteristics of a displayed object in accordance with said associated approximation for said performance value to indicate said problematic areas.

23. The data processing system of claim 21, wherein said providing indications of said determined approximations for said performance values on said graphical user interface includes:
detecting and highlighting a bottleneck in said entered flow on said graphical user interface.

24. The data processing system of claim 21, wherein said predetermined approximations include a maximum throughput and determining approximations for said performance values includes:
determining approximations for an actual throughput for said associated objects within said entered flow.

25. The data processing system of claim 21, wherein said providing indications of said determined approximations for said performance values on said graphical user interface includes:
displaying said approximations for said performance values on said graphical user interface via at least one of text, color coding, a symbol, object size, and object line width.

26. The data processing system of claim 21, wherein said determining approximations for said performance values includes:
determining approximations for said performance values based on one of a mathematical function and specifications provided by a flow design tool including said predetermined approximations.

27. The data processing system of claim 21, wherein said at least one processor further carries out:
simulating said entered flow and generating said performance values from said simulation; and
updating said determined approximations for said performance values with said generated performance values from said simulation.

28. The data processing system of claim 21, wherein said determining approximations for said performance values includes:
retrieving performance information from one or more external information stores each storing performance information including said predetermined approximations for one or more of said associated objects, and determining approximations for said performance values for said one or more of said associated objects based on said retrieved performance information.

29. The data processing system of claim 21, wherein said objects include an operator, at least one input channel and at least one output channel of an operator for input and output, and a link connecting operators.

30. The data processing system of claim 21, wherein said approximations for said performance values of said objects within said flow are each limited to a lowest rate of data represented by one of the predetermined approximation for that performance value and the approximations for performance values of one or more preceding ones of said interconnected objects within said flow.

* * * * *